US010549594B2

(12) United States Patent
Chihara et al.

(10) Patent No.: US 10,549,594 B2
(45) Date of Patent: Feb. 4, 2020

(54) LEAF SPRING DEVICE AND METHOD FOR MANUFACTURING LEAF SPRING DEVICE

(71) Applicant: NHK SPRING CO., LTD., Yokohama-shi, Kanagawa (JP)

(72) Inventors: Hidenori Chihara, Kanagawa (JP); Hiroto Tsuji, Kanagawa (JP); Shinichiro Kuwatsuka, Kanagawa (JP)

(73) Assignee: NHK SPRING CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/528,047

(22) PCT Filed: Nov. 10, 2015

(86) PCT No.: PCT/JP2015/081643
§ 371 (c)(1),
(2) Date: May 18, 2017

(87) PCT Pub. No.: WO2016/080249
PCT Pub. Date: May 26, 2016

(65) Prior Publication Data
US 2017/0313149 A1    Nov. 2, 2017

(30) Foreign Application Priority Data

Nov. 19, 2014  (JP) ................................ 2014-234850

(51) Int. Cl.
*B60G 11/04* (2006.01)
*C21D 9/02* (2006.01)
(Continued)

(52) U.S. Cl.
CPC .............. *B60G 11/04* (2013.01); *B21D 19/12* (2013.01); *B21D 53/886* (2013.01); *C21D 9/02* (2013.01);
(Continued)

(58) Field of Classification Search
CPC . B60G 11/02; C21D 1/18; C21D 1/60; C21D 1/42; C21D 9/02; C21D 2221/00; C21D 2221/008; F16F 1/18
See application file for complete search history.

(56) References Cited

U.S. PATENT DOCUMENTS 1,324,440 A     12/1919  Ackerman
2,861,798 A  *  11/1958  Lenet ..................... B60G 11/04
                                                    267/45
(Continued)

FOREIGN PATENT DOCUMENTS

CN    101287851 A    10/2008
CN    101397629 A     4/2009
(Continued)

OTHER PUBLICATIONS

International Search Report for PCT/JP2015/081643, dated Dec. 22, 2015.
(Continued)

*Primary Examiner* — Vishal R Sahni
(74) *Attorney, Agent, or Firm* — Merchant & Gould P.C.

(57) ABSTRACT

A leaf spring device includes a main leaf made of a steel plate including an elastic section configured to generate elastic force when bent; and an eye section formed in an end portion of the elastic section, the elastic section and the eye section being tempered. There is also provided a method for manufacturing the leaf spring device. The eye section is formed by rolling the end of the elastic section into a circular form. The eye section is tempered at a higher temperature than the elastic section.

2 Claims, 8 Drawing Sheets

(51) Int. Cl.
　　*B21D 19/12*　　(2006.01)
　　*B21D 53/88*　　(2006.01)
　　*F16F 1/26*　　(2006.01)
　　*F16F 3/02*　　(2006.01)

(52) U.S. Cl.
　　CPC ............... *F16F 1/26* (2013.01); *F16F 3/023* (2013.01); *C21D 2221/01* (2013.01); *F16F 2226/02* (2013.01)

(56) References Cited

U.S. PATENT DOCUMENTS

| | | | |
|---|---|---|---|
| 3,493,222 A | | 2/1970 | Mathers et al. |
| 5,100,482 A | * | 3/1992 | Tanaka ..................... C21D 9/02 148/653 |
| 5,365,646 A | | 11/1994 | Stephens |
| 5,366,238 A | | 11/1994 | Stephens |
| 5,771,955 A | * | 6/1998 | Helgesen ........... B22D 19/0009 164/11 |
| 6,257,591 B1 | * | 7/2001 | Abe ..................... F16J 15/0806 277/591 |
| 6,461,455 B1 | * | 10/2002 | Meatto ............... B29C 35/0272 156/273.7 |
| 8,912,472 B1 | * | 12/2014 | Kurylo ..................... F16F 1/00 219/635 |
| 2001/0013676 A1 | * | 8/2001 | Reast ..................... B60G 11/12 267/47 |
| 2002/0096249 A1 | * | 7/2002 | Meatto ............... B29C 35/0272 156/245 |
| 2015/0091225 A1 | * | 4/2015 | Wilson ..................... C21D 1/25 267/47 |
| 2017/0174029 A1 | | 6/2017 | Asbeck et al. |
| 2017/0322183 A1 | * | 11/2017 | Yang ........................ F02F 1/18 |

FOREIGN PATENT DOCUMENTS

| | | |
|---|---|---|
| CN | 102011821 A | 4/2011 |
| CN | 103131834 A | 6/2013 |
| EP | 0533146 A1 | 3/1993 |
| GB | 117163 A | 7/1918 |
| JP | 53-147158 A | 12/1978 |
| JP | 2006-212655 A | 8/2006 |
| JP | 2011-255432 A | 12/2011 |
| WO | 2015/121345 A1 | 8/2015 |

OTHER PUBLICATIONS

Search Report for European Patent Application No. 15860188.0, dated Jul. 4, 2018.
Office Action for Chinese Patent Application No. 201580062580.X, dated Jul. 17, 2018.

* cited by examiner

MATERIAL CUTTING

FIG. 4B

END PORTION HEATING

FIG. 4C

EYE PROCESSING

FIG. 4D

WHOLE HEATING    CAMBER FORMING

FIG. 5A

OIL QUENCHING → TEMPERING

FIG. 5B

EYE TEMPERING

FIG. 5C

SHOT-PEENING → UNDERCOATING

FIG. 5D

LEAF ASSEMBLING → COATING

BRINELL HARDNESS (HBW)

| MEAS- UREMENT POINTS | A8 | A7 | A6 | A5 | A4 | A3 | A2 | A1 | B6 | B5 | B4 | B3 | B2 | B1 |
|---|---|---|---|---|---|---|---|---|---|---|---|---|---|---|
| SP1 | 451 | 444 | 451 | 444 | 438 | 444 | 451 | 444 | 444 | 451 | 444 | 444 | 451 | 444 |
| SP2 | 471 | 471 | 464 | 471 | 471 | 471 | 471 | 471 | 471 | 471 | 471 | 464 | 471 | 464 |
| NEW | 444 | 438 | 444 | 438 | 444 | 438 | 444 | 444 | 477 | 471 | 471 | 477 | 471 | 471 |

FIG. 9C

LEAF SPRING DEVICE AND METHOD FOR MANUFACTURING LEAF SPRING DEVICE

CROSS-REFERENCE TO RELATED APPLICATION

This application is a U.S. National Stage Application under 35 U.S.C. § 371 of International Patent Application No. PCT/JP2015/081643 filed Nov. 10, 2015, which claims the benefit of priority to Japanese Patent Application No. 2014-234850, filed Nov. 19, 2014, the disclosures of all of which are hereby incorporated by reference in their entireties.

TECHNICAL FIELD

The present invention relates to a leaf spring device and a method of manufacturing the leaf spring device.

BACKGROUND

Leaf spring devices made from leaves which are each a plate-shaped steel (steel plate) are often used in suspension apparatuses of vehicles (particularly, heavy duty vehicles).

In recent years, there has been a demand for a reduction in the weight of vehicles. In response to this, there is a demand for a reduction in the weight of the leaf spring devices. Therefore, a high stress design has drawn attention in which: a material is heat-treated to have a higher hardness and thus have a higher fatigue strength (see Patent Literature 1).

CITATION LIST

Patent Literature

Patent Literature 1: Japanese Patent Application Publication No. 2011-255432

SUMMARY OF INVENTION

Technical Problem

An increase in the hardness (an increase in the fatigue strength) of a steel plate, however, results in a decrease in the toughness (ductility) of the steel plate. A decrease in the toughness of a connecting section (eye section) connected to the vehicle body makes fatigue fracture and delayed fracture more likely to occur in the connecting section. Thus, it is desirable that the connecting section of the leaf spring device have higher toughness.

In view of this, an object of the present invention is to provide a leaf spring device that achieves both of high fatigue strength and preferable toughness of a connecting section, and a method of manufacturing a leaf spring device.

Solution to Problem

To solve the above problems, the present invention is a leaf spring device characterized as follows. The leaf spring device includes a main leaf which is made of a steel plate, and which includes: an elastic section configured to generate elastic force when bent; and a connecting section formed in an end portion of the elastic section. The elastic section and the connecting section are quenched and tempered. The connecting section is tempered at a higher temperature than the elastic section.

According to the present invention, the connecting section of the leaf spring device is tempered at the higher temperature than the elastic section. Since the main leaf is made of the steel plate, the connecting section tempered at the higher temperature than the elastic section has higher toughness than the elastic section. Meanwhile, since the elastic section can be tempered at a lower temperature, fatigue strength of the elastic section can be increased. Thus, fatigue fracture and delayed fracture of the connecting section is inhibited in the leaf spring device. Meanwhile, the leaf spring device can include the elastic section with higher fatigue strength. Thus, while the leaf spring device is on the market, the delayed fracture is inhibited from occurring in the leaf spring device. Moreover, the fatigue fracture is inhibited from occurring in the leaf spring device when a long period of time elapses after the leaf spring device is put on the market.

Furthermore, the leaf spring device of the present invention is characterized in that the connecting section is an eye section formed by rolling the end portion of the elastic section into a circular form.

According to the present invention, the leaf spring device includes the eye section whose toughness is higher than that of the elastic section.

The leaf spring device of the present invention is further characterized in that the main leaf and at least one auxiliary leaf are stacked one on another, the auxiliary leaf including no connecting section.

According to the present invention, the leaf spring device is made from the main leaf and the auxiliary leaf stacked one on another, the main leaf including the connecting section, the auxiliary leaf including no connecting section.

The leaf spring device of the present invention is further characterized in that the auxiliary leaf is tempered at the same temperature as the elastic section of the main leaf.

According to the present invention, the fatigue strength of the auxiliary leaf included in the leaf spring device by being stacked on the main leaf is raised to the same level as the elastic section of the main leaf.

The leaf spring device of the present invention is further characterized in that the connecting section is lower in the Brinell hardness (HBW) than the elastic section.

According to the present invention, in the leaf spring device, the hardness (Brinell hardness) of the connecting section is made lower than that of the elastic section. Thus, the leaf spring device includes the connecting section whose toughness is higher than that of the elastic section.

The leaf spring device of the present invention is further characterized in that: the Brinell hardness of the elastic section is higher than 461 HBW; and the Brinell hardness of the connecting section is 461 HBW or less.

According to the present invention, since the Brinell hardness of the connecting section is made lower than 461 HBW in the case where the Brinell hardness of the elastic section of the main leaf is higher than 461 HBW, durability of the connecting section is increased while inhibiting a decrease in the toughness of the connecting section.

Another aspect of the present invention is a method for manufacturing a leaf spring device including a main leaf made of a steel plate. The method of manufacturing a leaf spring device is characterized in that the method includes: a normal-tempering step of tempering an elastic section of the main leaf, the elastic section configured to generate elastic force when bent; and a high-temperature tempering step of tempering a connecting section at a higher temperature than the elastic section, the connecting section formed in an end portion of the elastic section.

According to the present invention, the connecting section of the leaf spring device is tempered at the higher temperature than the elastic section. Since the main leaf is made of the steel plate, the toughness of the connecting section is increased by tempering the connecting section at the higher temperature. Meanwhile, since the elastic section is tempered at a lower temperature, fatigue strength of the elastic section is increased. These make it possible to manufacture the leaf spring device which includes: the connecting section with the higher toughness; and the elastic section with the higher fatigue strength.

The method for manufacturing a leaf spring device of the present invention is further characterized in that the method further includes an eye section forming step of forming an eye section serving as the connecting section, before the normal-tempering step, and the eye section forming step is a step of forming the eye section by rolling the end portion of the elastic section into a circular form.

According to the present invention, the eye section formed in the eye section forming step is tempered in the high-temperature tempering step. This makes it possible to manufacture the leaf spring device which includes the eye section with higher toughness.

The method for manufacturing a leaf spring device of the present invention is further characterized in that the method further includes an assembling step of assembling the leaf spring device by stacking the main leaf and at least one auxiliary leaf one on another, after the high-temperature tempering step, the main leaf including the eye section formed in the eye section forming step, the at least one auxiliary leaf including no eye section.

According to the present invention, the leaf spring device can be manufactured by stacking the main leaf and the at least one auxiliary leaf one on another, the main leaf including the eye section which is formed in the eye section forming step and tempered in the high-temperature tempering step, the auxiliary leaf including no eye section.

The method for manufacturing a leaf spring device of the present invention is further characterized in that the auxiliary leaf is tempered in the normal-tempering step.

According to the present invention, the fatigue strength of the auxiliary leaf is raised to the same level as the main leaf, and the leaf spring device including the stacked auxiliary leaf with the higher fatigue strength is manufactured.

The method for manufacturing a leaf spring device of the present invention is further characterized in that: the normal-tempering step is a step of tempering the elastic section such that the Brinell hardness of the elastic section is higher than 461 HBW; and the high-temperature tempering step is a step of tempering the connecting section such that Brinell hardness of the connecting section is 461 HBW or less.

According to the present invention, the Brinell hardness of the elastic section of the main leaf is made higher than 461 HBW, and the Brinell hardness of the connecting section is made 461 HBW or less. Furthermore, the hardness (Brinell hardness) of the connecting section is be made lower than the hardness (Brinell hardness) of the elastic section, and the leaf spring device including the connecting section whose toughness is higher than that of the elastic section is manufactured.

Advantageous Effects of Invention

According to the present invention, it is possible to provide: a leaf spring device which includes a leaf with high fatigue strength, and in which suitable toughness is secured for a connecting section; and a method of manufacturing the leaf spring device.

DESCRIPTION OF EMBODIMENTS

Hereinafter, embodiments of the present invention will be described in detail with reference to the drawings as appropriate.

Figure 1:
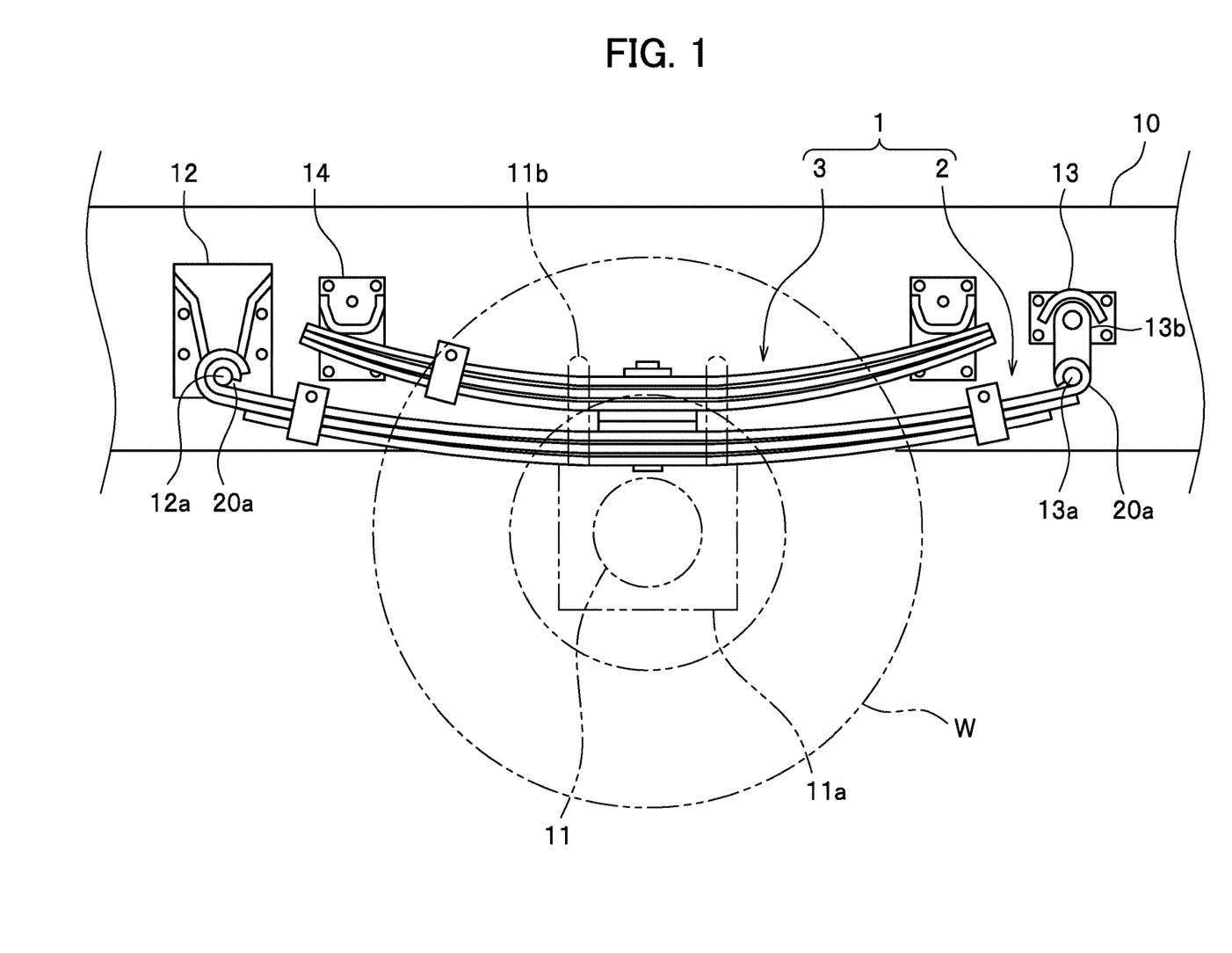
FIG. 1 is a diagram illustrating a leaf spring device attached to a chassis.

FIG. 1 is a diagram illustrating a leaf spring device attached to a chassis.

As illustrated in FIG. 1, the leaf spring device 1 of the present invention is provided to a vehicle body (chassis 10) of a heavy-duty vehicle (not illustrated) such as a truck, and supports an axle 11.

The leaf spring device 1 of the present invention includes a main spring 2 and a helper spring 3. The helper spring 3 is placed over the main spring 2. Incidentally, the leaf spring device 1 does not have to include the helper spring 3.

The leaf spring device 1 includes eye sections 20a. Each eye section 20a serves as a connecting section for connecting the leaf spring device 1 and the chassis 10. Two eye sections 20a are formed in two ends of the main spring 2, respectively.

The chassis 10 is made of a frame extending in the front-rear direction of the heavy-duty vehicle, and includes attachment portions (a front attachment portion 12, and a rear attachment portion 13) to which to attach the leaf spring device 1. The front attachment portion 12 is placed in front of the rear attachment portions 13.

The front attachment portion 12 is made of a bracket, and is attached to a side surface of the chassis 10 with multiple bolts. The front attachment portion 12 includes a front spindle 12a which extends in a direction in which the front spindle 12a projects from the side surface of the chassis 10.

The rear attachment portion 13 is made of a bracket, and is attached to the side surface of the chassis 10 with multiple bolts. An arm portion 13b configured to swing in the front-rear direction along the chassis 10 is attached to the rear attachment portion 13. The arm portion 13b includes a rear spindle 13a which extends in a direction in which the rear spindle 13a projects from the side surface of the chassis 10.

One eye section 20a of the leaf spring device 1 is fitted around the front spindle 12a of the front attachment portion 12, while the other eye section 20a is fitted around the rear spindle 13a of the rear attachment portion 13.

As discussed above, the main spring 2 of the leaf spring device 1 is attached to the chassis 10 with the front attachment portion 12 and the rear attachment portion 13.

The chassis 10 includes restriction brackets 14 for restricting upward movement of the helper spring 3. The restriction brackets 14 are disposed on two end portions of the helper spring 3, and press the helper spring 3 from above.

A housing 11a is attached to the leaf spring device 1. The housing 11a is suspended from the leaf spring device 1, for example with a U bolt 11b. The housing 11a rotatably supports the axle 11. A wheel W is attached to the axle 11.

Figure 2:
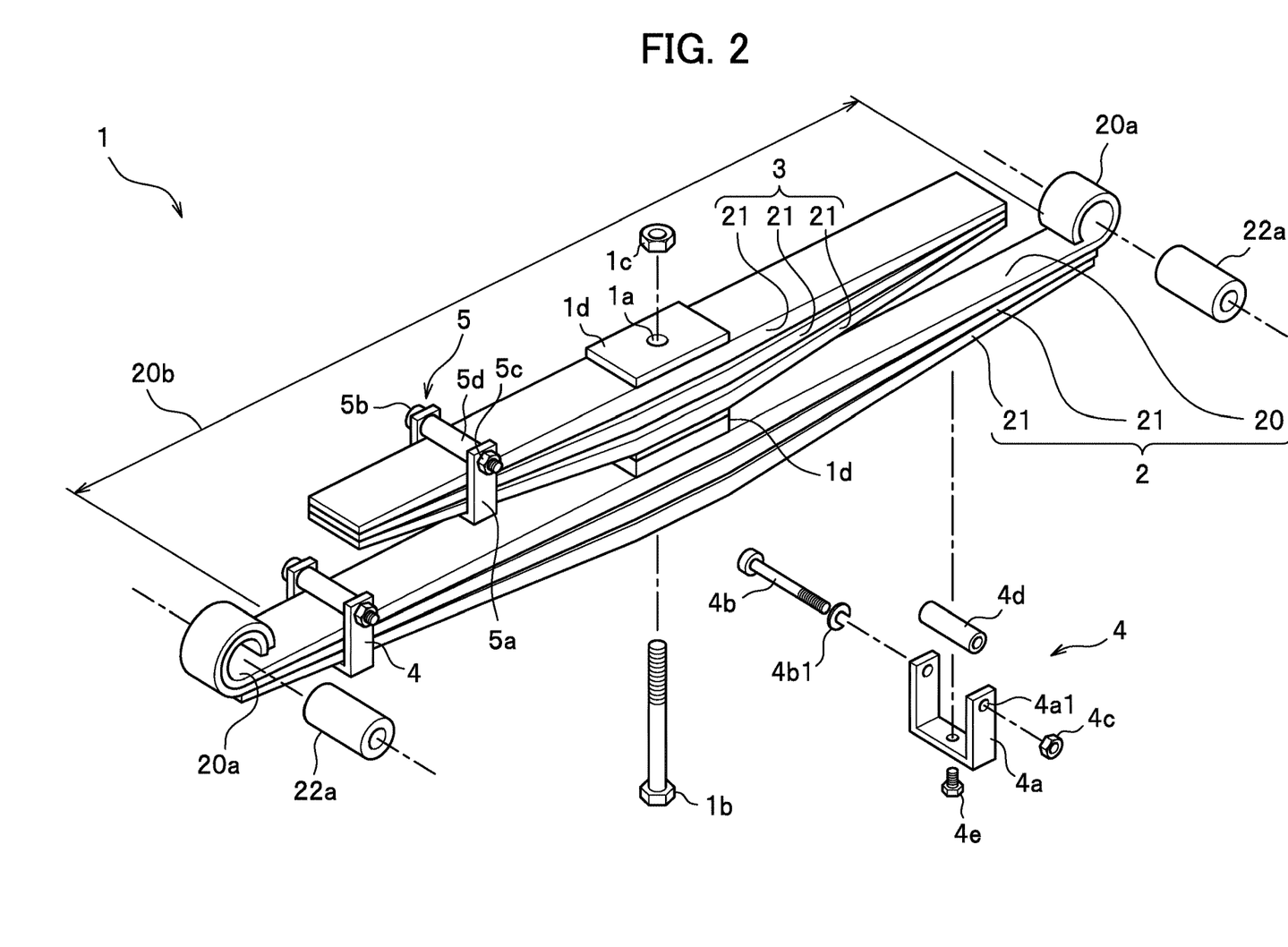
FIG. 2 is a perspective view of the leaf spring device.

FIG. 2 is a perspective view of the leaf spring device.

As illustrated in FIG. 2, the main spring 2 is made from multiple stacked leaves (one main leaf 20 and two auxiliary leaves 21 in the embodiment). Meanwhile, the helper spring 3 is made from multiple stacked leaves (three auxiliary leaves 21 in the embodiment).

The main leaf 20 and the auxiliary leaves 21 included in the main spring 2 are each an elongated steel plate extending along the chassis 10 (see FIG. 1), and arched. When the wheel W (see FIG. 1) is attached to the axle 11 (see FIG. 1), a part of the wheel W, which is located on the same side as the projecting parts of the main leaf 20 and the auxiliary leaves 21, comes into contact with the road surface. In other words, the main spring 2 is made from the main leaf 20 and the auxiliary leaves 21 stacked one on another while curving downward (toward the road surface).

It should be noted that the material of the main leaf 20 and the auxiliary leaves 21 of the present invention is SUPS (a spring steel), for example.

Also, the helper spring 3 is made from the three auxiliary leaves 21 stacked one on another while curving downward (toward the road surface).

The eye sections 20a each serving as the connecting section for connecting the leaf spring device 1 and the chassis 10 (see FIG. 1) are formed in the respective two longitudinal-direction ends of the main spring 2. The main spring 2 is attached to the chassis 10 with the eye sections 20a.

It should be noted that unlike the eye sections 20a, the other section of the main leaf 20 serves as an elastic section 20b which generates elastic force when bent. The eye sections 20a are formed in the end portions (the two end portions) of the elastic section 20b, respectively.

The leaf spring device 1 is attached to the chassis 10 (see FIG. 1) with the eye sections 20a. Thus, the eye sections 20a provide no displacement relative to the chassis 10, or generate no elastic force. Unlike the eye sections 20a, the other section of the leaf spring device 1 is bent by being displaced relative to the chassis 10, and generates elastic force.

The main spring 2 of the embodiment is made from the main leaf 20 and the two auxiliary leaves 21 stacked one on another in order from above. In other words, the main leaf 20 is placed uppermost.

In addition, the main leaf 20 and the auxiliary leaves 21 curve downward. Thereby, the main spring 2 is shaped curving downward.

The main leaf 20 and the two auxiliary leaves 21 thus stacked are fastened together with clip members (main spring clips 4). Each main spring clip 4 includes a main body portion 4a, a clip bolt 4b, a clip nut 4c, a clip pipe 4d, and a fixing bolt 4e.

The main body portion 4a is a U-shaped frame member whose upper portion is open. The main body portion 4a is fitted to the main leaf 20 and the auxiliary leaves 21 from under, and surrounds the main leaf 20 and the auxiliary leaves 21 except from above.

The clip bolt 4b is joined to the upper portion of the main body portion 4a. For example, in a case where the main body portion 4a is made by bending a flat plate, bolt holes 4a1 through which to insert the clip bolt 4b are made in the main body portion 4a. Above the uppermost-disposed main leaf 20, the clip bolt 4b is inserted from one bolt hole 4a1 to the other bolt hole 4a1 in the main body portion 4a, and the clip nut 4c is screwed onto the clip bolt 4b. The clip pipe 4d is provided surrounding the clip bolt 4b which extends from the one bold hole 4a1 to the other bolt hole 4a1. In other words, the clip bolt 4b is inserted through the clip pipe 4d.

Incidentally, reference sign 4b1 denotes a washer (a spring washer or the like) to be disposed between the clip bolt 4b and the main body portion 4a.

Meanwhile, a screw hole (not illustrated) is formed in the lowermost-disposed auxiliary leave 21 at a position to which the main body portion 4a is fitted. The fixing bolt 4e is screwed into this screw hole from under the main body portion 4a. The main body portion 4a is fastened and fixed to the lowermost-disposed auxiliary leave 21 with the fixing bolt 4e.

The main leaf 20 and the two auxiliary leaves 21 stacked are fastened together with an appropriate number of main spring clips 4 (two main spring clips 4 in FIG. 2).

The helper spring 3 is made from the three auxiliary leaves 21 stacked one on another. Each auxiliary leave 21 curves downward. Thereby, the helper spring 3 is shaped curving downward.

The thus-stacked three auxiliary leaves 21 are fastened together with a clip member (a helper spring clip 5). The helper spring clip 5 includes a main body portion 5a, a clip bolt 5b, a clip nut 5c, a clip pipe 5d, and a fixing bolt (not illustrated).

The helper spring clip 5 has the same structure as the main spring clips 4, and fastens the three auxiliary leaves 21 together. The stacked auxiliary leaves 21 are fastened together with an appropriate number of helper spring clip 5 (one helper spring clip 5 in FIG. 2).

It should be noted that a screw hole (not illustrated) into which to screw the fixing bolt (not illustrated) is formed in the lowermost-disposed auxiliary leaf 21 in the helper spring 3, like the main leaf 2.

A bolt hole 1a is formed in the longitudinal-direction center portions of the main spring 2 and the helper spring 3. The bolt hole 1a extends through the main leaf 20 and the two auxiliary leaves 21 in the main spring 2, as well as the three auxiliary leaves 21 in the helper spring 3.

After the helper spring 3 is disposed above the main spring 2, a center bolt 1b is inserted through the bolt holes 1a of the main spring 2 and the helper spring 3, and a bolt nut 1c is screwed onto the center bolt 1b. For example, the center bolt 1b penetrates through the main spring 2 and the helper spring 3 from under, and the bolt nut 1c is screwed onto the center bolt 1b from above.

In this manner, the helper spring 3 is fastened and fixed to the main spring 2 with the center bolt 1b.

It should be noted that a spacer 1d may be disposed between the main spring 2 and the helper spring 3, and above the helper spring 3, depending on the necessity.

The eye sections 20a are formed in the two end portions of the main spring 2. The eye sections 20a each serve as the connecting section for connecting the leaf spring device 1 and the chassis 10 (see FIG. 1). Bushes 22a are inserted into the eye sections 20a, respectively.

Figure 3:
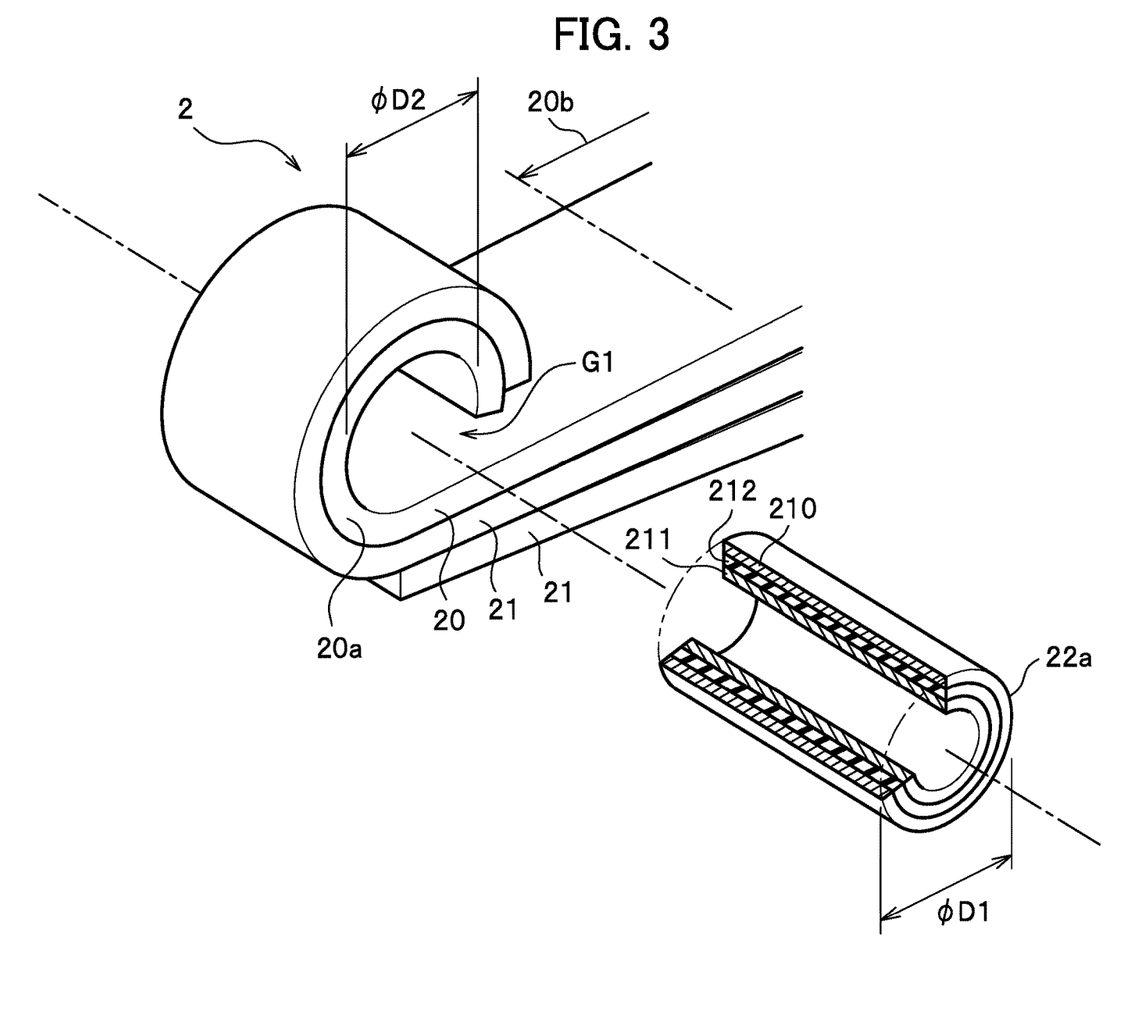
FIG. 3 is a magnified view of an eye section.

FIG. 3 is a magnified view of the eye section.

In the main spring 2 of the embodiment, each eye section 20a is formed by rolling the corresponding end portion of the uppermost-disposed main leaf 20, in the main spring 2, upward to the inside in a circular form. Specifically, each eye section 20a is formed by rolling the corresponding end portion of the elastic section 20b upward to the inside in a circular form. In addition, a gap G1 is formed at the inner end portion of the eye section 20a (between the inner end portion of the eye section 20a and the elastic section 20b).

It should be noted that one end (or the two ends) of the auxiliary leaf 21 located second from the top in the main spring 2 may be rolled around the corresponding one of (or the two) eye sections 20a formed in the main leaf 20. This structure will provide a backup function in case of damage on the eye section(s) 20a.

The bushes 22a to be inserted into the respective eye sections 20a are formed to have the outer diameter φD1 which is slightly larger than the inner diameter φD2 of the eye sections 20a (φD1>φD2). Each bush 22a is press-fitted into the corresponding eye section 20a. The eye section 20a retains the bush 22a by the elasticity of the steel plate formed into the main leaf 20.

The bush 22a is formed from a metal-made outer cylinder 210 in which a metal-made inner cylinder 211 is provided, and an elastic member 212 is disposed between the outer cylinder 210 and the inner cylinder 211. The elastic member 212 is made of an elastic material such as rubber. The front spindle 12a of the front attachment portion 12 (see FIG. 1) or the rear spindle 13a of the rear attachment portion 13 (see FIG. 1) is inserted into the inner cylinder 211. The leaf spring device 1 is attached to the chassis 10 (see FIG. 1) using the bushes 22a respectively provided to the eye sections 20a.

FIGS. 4A to 4D and 5A to 5D are diagrams illustrating a main manufacturing process of a method for manufacturing the leaf spring device. FIGS. 4A to 4D are the diagrams respectively illustrating first to fourth steps. FIGS. 5A to 5D are the diagrams respectively illustrating fifth to eighth steps.

Figure 4A:
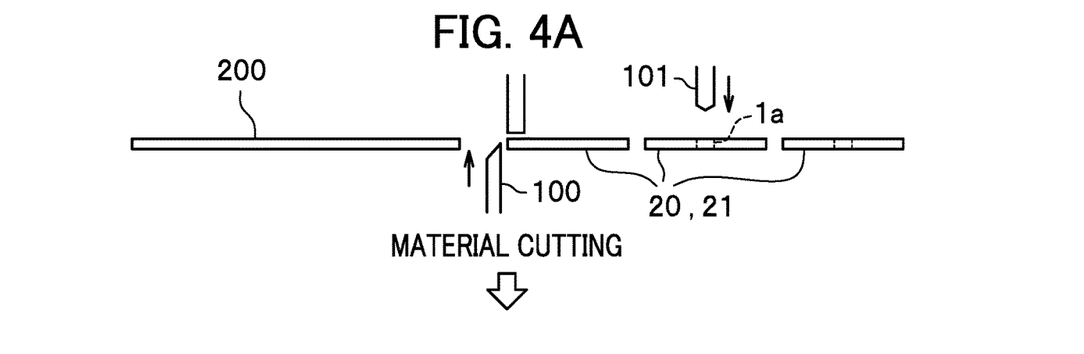
FIG. 4A is a diagram illustrating a first step in a main manufacturing process of a method for manufacturing the leaf spring device.
Figure 5A:
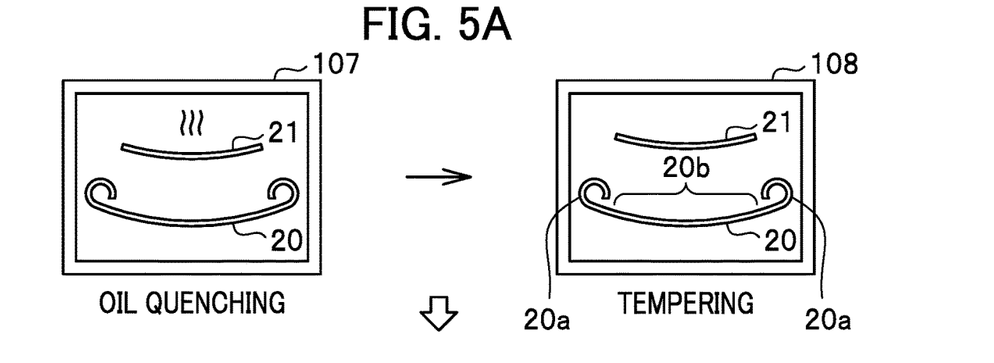
FIG. 5A is a diagram illustrating a fifth step in a main manufacturing process of a method for manufacturing the leaf spring device.
Figure 5B:
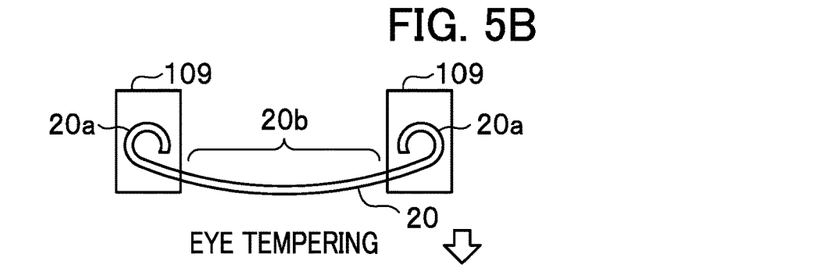
FIG. 5B is a diagram illustrating a sixth step in a main manufacturing process of a method for manufacturing the leaf spring device.
Figure 5C:
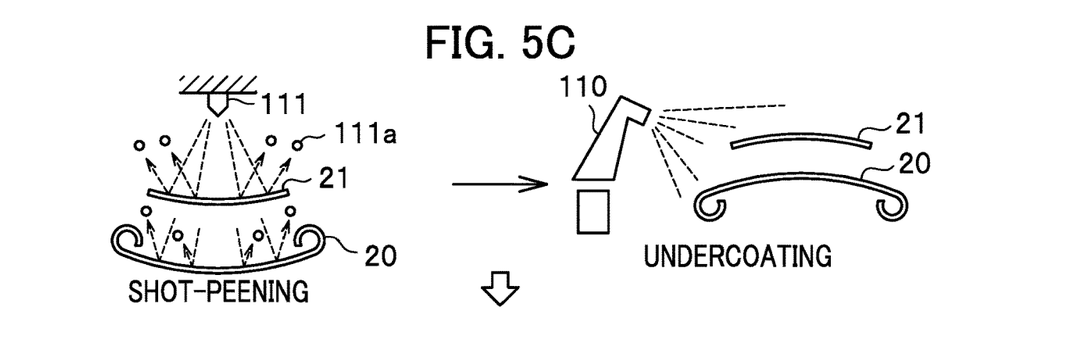
FIG. 5C is a diagram illustrating a seventh step in a main manufacturing process of a method for manufacturing the leaf spring device.
Figure 5D:
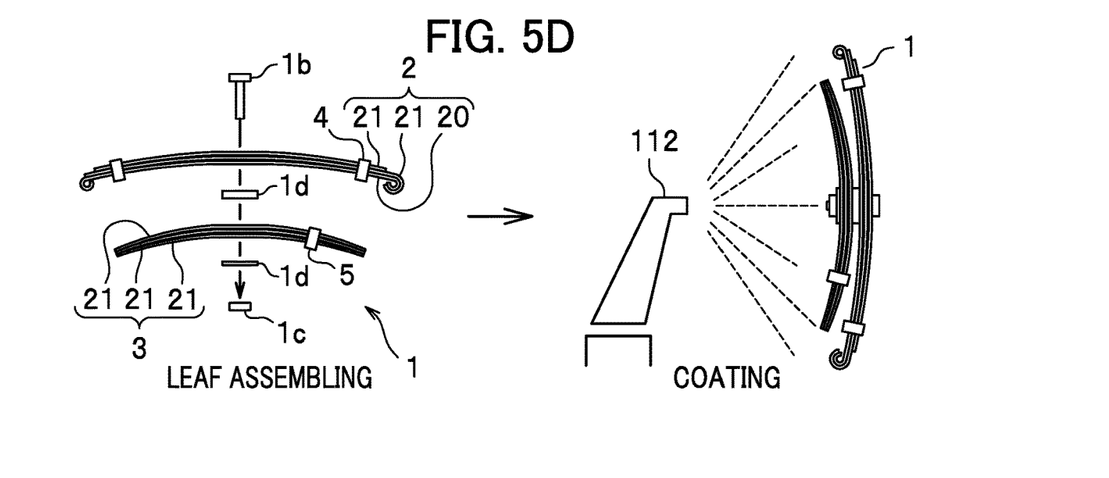
FIG. 5D is a diagram illustrating an eighth step in a main manufacturing process of a method for manufacturing the leaf spring device.

The leaf spring device 1 is manufactured through the eight steps from the first step (material cutting) illustrated in FIG. 4A to the eighth step (leaf assembling and coating) illustrated in FIG. 5D as main manufacturing steps.

«First Step (Material Cutting)»

In the first step (material cutting) illustrated in FIG. 4A, a steel plate 200 is cut into pieces whose shapes correspond to the main leaf 20 and the auxiliary leaves 21. For example, a cutting machine 100 cuts the steel plate 200 with a width equal to that of the leaf spring device 1 into a piece with a length equal to that of the main leaf 20 and pieces with lengths equal to those of the auxiliary leaves 21.

Furthermore, in the first step, a punching machine 101 or the like processes the bolt holes 1a in the main leaf 20 and the auxiliary leaves 21. The screw holes (not illustrated) into which to screw the fixing bolt 4e (see FIG. 2) are also formed in the first step.

Figure 4B:
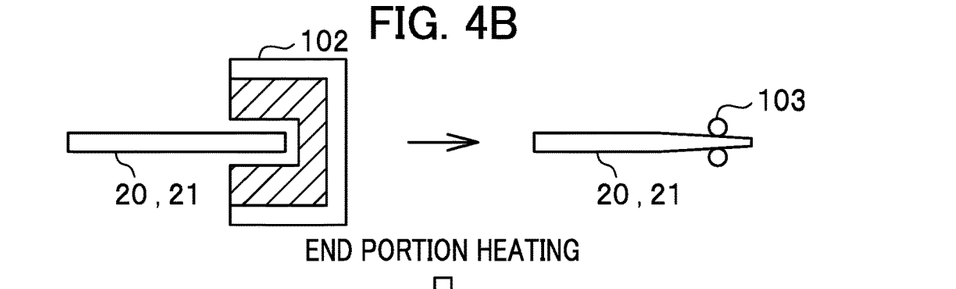
FIG. 4B is a diagram illustrating a second step in a main manufacturing process of a method for manufacturing the leaf spring device.

«Second Step (End Portion Heating)»

In the second step (end portion heating) illustrated in FIG. 4B, an end portion heater 102 heats the end portions of the main leaf 20 and the auxiliary leaves 21. Furthermore, in the second step, a pressing machine 103 or the like processes the end portions of the main leaf 20 and the auxiliary leaves 21 into any shapes (processes into tapered shapes and the like depending on the necessity). For example, when the main leaf 20 and the auxiliary leaves 21 are each tapered toward their two longitudinal-direction ends, the leaves (the main leaf 20 and the auxiliary leaves 21) can be formed each to have a smaller plate thickness at their two end portions and a larger plate thickness at their center portions.

Figure 4C:
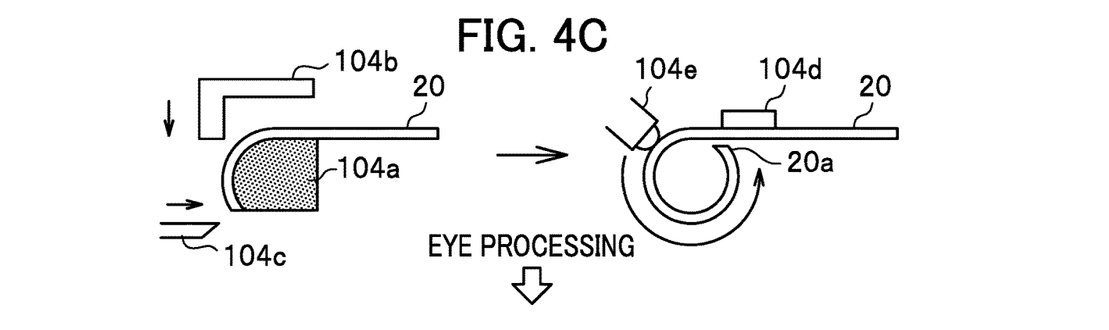
FIG. 4C is a diagram illustrating a third step in a main manufacturing process of a method for manufacturing the leaf spring device.

«Third Step (Eye Processing)»

In the third step (eye processing) illustrated in FIG. 4C, each eye section 20a is formed in the main leaf 20. In the third step, the main leaf 20 is pressed against a die 104a using a bending hook 104b. Thereafter, the end portion of the main leaf 20 is cut using a cutter 104c, and is curved. Subsequently, while the main leaf 20 is held by a pressing member 104d, the end portion of the main leaf 20 is rolled by a die 104e. Thereby, the eye section 20a is formed there.

Furthermore, in the case where as illustrated in FIG. 3, the eye section 20a is covered with the end portion of the auxiliary leaf 21, the end portion of the auxiliary leaf 21 is formed into a shape corresponding to that of the eye section 20a in the third step.

Besides, note that the third step (eye processing) is not performed on the auxiliary leaves 21. The eye processing in the third step is an eye section forming process to form the eye section 20a to be the connecting section.

Figure 4D:
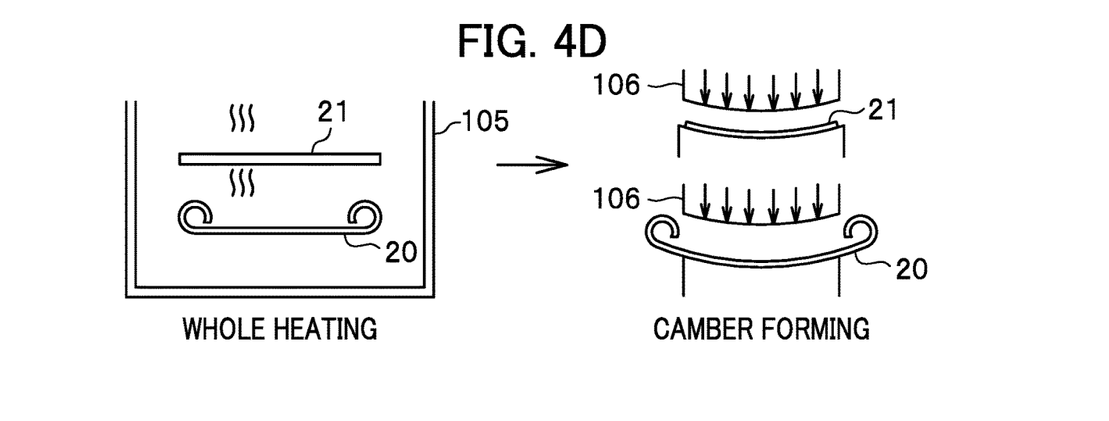
FIG. 4D is a diagram illustrating a fourth step in a main manufacturing process of a method for manufacturing the leaf spring device.

«Fourth Step (Whole Heating and Camber Forming)»

In the fourth step (whole heating and camber forming) illustrated in FIG. 4D, a whole-heating device 105 heats the entirety of the main leaf 20 and the auxiliary leaves 21. Thereafter, a press device 106 presses (hot-processing) the main leaf 20 and the auxiliary leaves 21, and thereby forms the main leaf 20 and the auxiliary leaves 21 into an arched shape (into a cambered shape).

«Fifth Step (Oil Quenching and Tempering)»

In the fifth step (oil quenching and tempering) illustrated in FIG. 5A, in a quenching furnace 107, the main leaf 20 and the auxiliary leaves 21 are heated and thereafter oil-quenched by being rapidly cooled with oil. The oil quenching increases the fatigue strength of the main leaf 20 and the auxiliary leaves 21.

Thereafter, the main leaf 20 and the auxiliary leaves 21 are put into a tempering furnace 108 and tempered therein. Inside the tempering furnace 108, the main leaf 20 and the auxiliary leaves 21 are heated to a predetermined temperature, and thereafter slowly cooled. The tempering increases the toughness of the main leaf 20 and the auxiliary leaves 21. The tempering in the fifth step is a tempering step (normal-tempering step) of tempering the elastic section 20b of the main leaf 20 in order to increase the toughness thereof.

«Sixth Step (Eye Tempering)»

In the sixth step (eye tempering) illustrated in FIG. 5B, the eye sections 20a of the main leaf 20 are tempered at a higher temperature than in the fifth step. In the sixth step, a partial-heating device 109 heats and tempers the eye sections 20a of the main leaf 20. The partial-heating device 109 heats and tempers the eye sections 20a at the higher temperature than in the fifth step. Incidentally, in the sixth step, unlike the eye sections 20a, the other section (the elastic section 20b) of the main leaf 20 is cooled (slowly cooled). In other words, the slow cooling after the quenching in the fifth step continues into the sixth step. On the other hand, the sixth step (eye tempering) is not applied to the auxiliary leaves 21. As discussed above, neither the elastic section 20b of the main leaf 20 nor the auxiliary leaves 21 are tempered in the sixth step. This means that the auxiliary leaves 21 are tempered at the same temperature as the elastic section 20b of the main leaf 20.

The eye tempering in the sixth step is a high-temperature tempering step of tempering the eye sections 20a at the higher temperature than the elastic section 20b.

It should be noted that although FIG. 5B illustrates the high-temperature tempering step of tempering the eye sections 20a as the sixth step which comes after the normal tempering step (the fifth step), the high-temperature tempering step and the normal tempering step may be performed in a single step.

For example, the normal tempering step (the fifth step) may be configured such that the partial-heating device 109 heats and tempers only the eye sections 20a at the high temperature. This configuration makes it possible to perform the high-temperature tempering step and the normal tempering step in a single step.

«Seventh Step (Shot-Peening and Undercoating)»

In the seventh step (shot-peening and undercoating) illustrated in FIG. 5C, the main leaf 20 and the auxiliary leaves 21 are shot-peened, and thereafter undercoated. In the shot-peening process, a shot blasting device 111 fires shots (small particles 111a) at the main leaf 20 and the auxiliary leaves 21. The shot-peening increases fatigue strength of the main leaf 20 and the auxiliary leaves 21 by producing a compressive residual stress layer in the surfaces of the main leaf 20 and the auxiliary leaves 21.

In the undercoating process, a coating device 110 sprays an undercoating material to the main leaf 20 and the auxiliary leaves 21.

«Eighth Step (Leaf Assembling and Coating)»

In the eighth step (leaf assembling and coating) illustrated in FIG. 5D, the leaf spring device 1 is assembled and thereafter coated.

In the leaf assembling process, the main spring 2 is assembled by stacking the main leaf 20 and the auxiliary leaves 21 one on another. In this process, the main leaf 20 and the auxiliary leaves 21 are fastened together with the main spring clips 4. Meanwhile, the helper spring 3 is assembled by stacking the three auxiliary leaves 21 one on another. In this process, the three auxiliary leaves 21 are fastened together with the helper spring clip 5. Thereafter, the helper spring 3 is attached to the main spring 2. The main spring 2 and the helper spring 3 are fastened and fixed together with the center bolt 1b and the bolt nut 1c. Thereby, the leaf spring device 1 is assembled.

Furthermore, in the coating process, the thus-assembled leaf spring device 1 is coated. In this process, a spray gun 112 sprays the coating paint to the leaf spring device 1. Thereby, the leaf spring device 1 is coated.

Incidentally, there is a case where various tests including a load test are performed before the coating process.

The leaf assembling in the eighth step is an assembling step of assembling the leaf spring device 1 by stacking the main leaf 20, including the leaf eye sections 20a, and the auxiliary leaves 21, including no leaf eye sections 20a, one on another.

The leaf spring device 1 assembled through the first to eighth steps illustrated in FIGS. 4A to 4D and 5A to 5D is subjected to tests needed for its shipment. Thereafter, the leaf spring device 1 is packed and shipped.

As discussed above, the leaf spring device 1 of the embodiment is manufactured mainly through the eight steps from the first step (see FIG. 4A) to the eighth step (see FIG. 5D). The fifth step is the normal-tempering step in which the main leaf 20 and the auxiliary leaves 21 are tempered in order to increase their fatigue strength.

Figure 6:
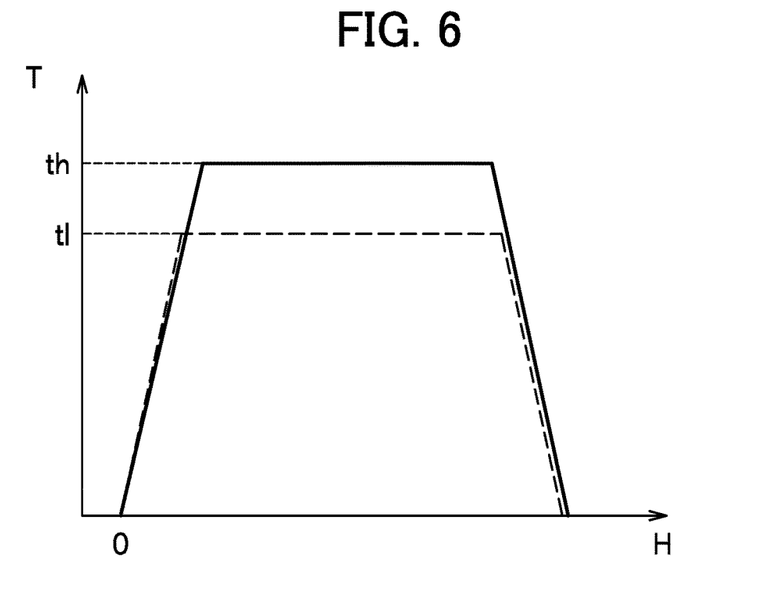
FIG. 6 is a diagram illustrating a heating temperature for tempering.

FIG. 6 is a diagram illustrating a heating temperature for the tempering.

It should be noted that in the graph of FIG. 6, the vertical axis represents the heating temperature (T) while the horizontal axis represents an elapsing time (H).

The tempering of the steel plate at a high temperature (temperature th° C. illustrated in FIG. 6) increases the toughness of the steel plate, but decreases the fatigue strength of the steel plate. In other words, the tempering of the steel plate at a lower temperature (temperature tl° C. illustrated in FIG. 6) makes it possible to secure higher fatigue strength for the steel plate. However, the steel plate with the increased fatigue strength has lower toughness.

As illustrated in FIGS. 2 and 3, the bushes 22a are press-fitted into the respective eye sections 20a. Each bush 22a is formed to have the outer diameter φD1 which is slightly larger than the inner diameter φD2 of the eye section 20a. When the bush 22a is press-fitted into the eye section 20a, the eye section 20a remain having the residual stress. Meanwhile, as discussed above, the leaf spring device 1 is attached to the chassis 10 (see FIG. 1) with the eye sections 20a which each serves as the connecting section. The load of the axle 11 (see FIG. 1) is inputted into the leaf spring device 1. Thus, external force is inputted into the eye sections 20a from the front spindle 12a (see FIG. 1) or the rear spindle 13a (see FIG. 1) of the chassis 10.

As discussed above, the press-fitting of the bushes 22a into the eye sections 20a produces the residual stress in the eye sections 20a, while the external force is inputted into the eye sections 20a from the chassis 10. Accordingly, fatigue fracture and delayed fracture have tendency to occur in the eye sections 20a.

In order to effectively inhibit the fatigue fracture and the delayed fracture from occurring in the eye sections 20a, it is desirable that the eye sections 20a have higher toughness. With this taken into consideration, in the sixth step (the high-temperature tempering step) illustrated in FIG. 5B in the embodiment, the eye sections 20a are tempered at the higher temperature than in the fifth step in order to increase the toughness of the eye sections 20a.

Figure 7:
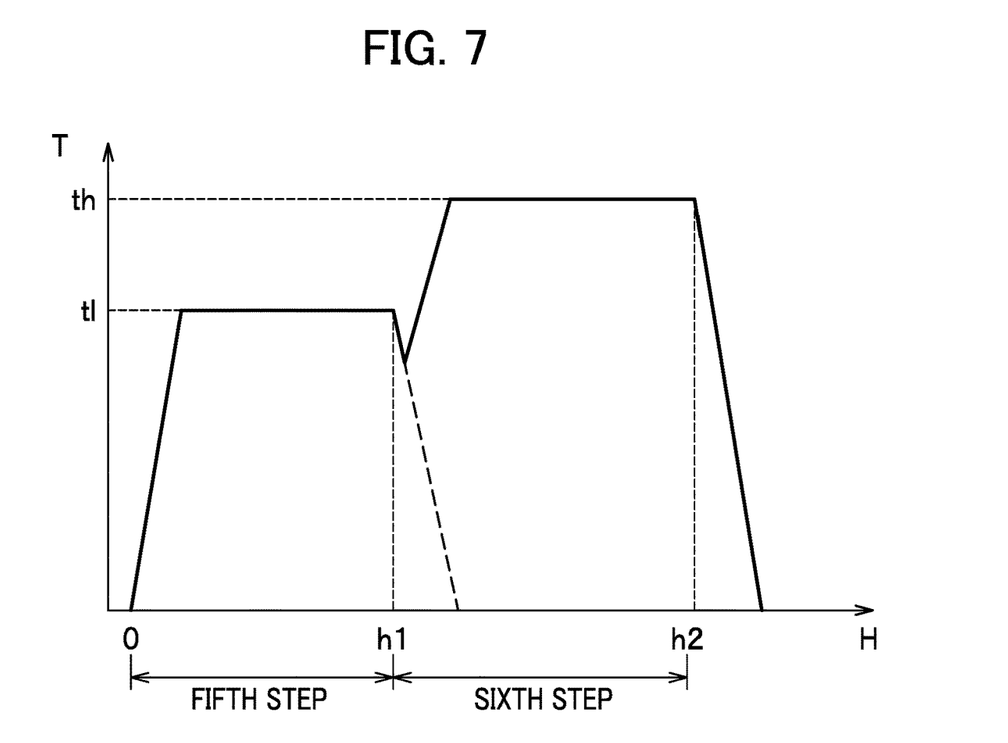
FIG. 7 is a graph illustrating a process of tempering a main leaf which includes the eye sections.

FIG. 7 is a graph illustrating a process of tempering the main leaf which includes the eye sections.

It should be noted that in the graph in FIG. 7, the vertical axis represent a heating temperature (T) while the horizontal axis represents an elapsing time (H).

As illustrated in FIGS. 4C, 4D, 5A and 5B, in the process of manufacturing the leaf spring device 1 (see FIG. 2), the main leaf 20 (see FIG. 2) with the eye sections 20a (see FIG. 2) formed therein is tempered in the fifth and sixth steps.

The tempering in the fifth step of the embodiment is performed such that the entirety of the main leaf 20 is tempered. The tempering in the sixth step of the embodiment is performed such that the eye sections 20a are tempered at the temperature higher than in the fifth step.

As illustrated in FIG. 7, the tempering in the fifth step is performed such that: the heating temperature is set at a predetermined temperature (tl° C.); and the entirety of the main leaf 20 is tempered (normal-tempered) for a predetermined length of time (0 to h1 seconds).

In the sixth step, a partial tempering is performed such that: the heating temperature is set at a predetermined temperature (th° C.); and only the eye sections 20a are tempered (high temperature-tempered) for a predetermined length of time (h1 to h2 seconds). The heating temperature (th° C.) in the sixth step is set higher than the heating temperature (tl° C.) in the fifth step (th>tl).

It should be noted that the heating temperature (tl° C.) and the heating length of time (0 to h1 seconds) in the fifth step are determined appropriately depending on the fatigue strength required for the main leaf 20. Meanwhile, the heating temperature (th° C.) and the heating length of time (h1 to h2 seconds) in the sixth step are determined appropriately depending on the toughness and the like required for the eye sections 20a of the main leaf 20.

Furthermore, the bold dashed line in FIG. 7 represents a decrease in the temperature of the portion (the elastic section 20b of the main leaf 20) not being tempered in the sixth step.

As illustrated in FIG. 7, the toughness of the eye sections 20a (see FIG. 2) is increased by, in the sixth step, tempering the eye sections 20a at the higher temperature than in the fifth step. Thus, in the main leaf 20 (see FIG. 2), the toughness of the eye sections 20a becomes higher than the toughness of the elastic section 20b (see FIG. 3), as well as the fatigue fracture and delayed fracture of the eye sections 20a are inhibited. Meanwhile, the elastic section 20b of the main leaf 20 is not high temperature-tempered in the sixth step, and accordingly remains having its high fatigue strength. In other words, the employment of the manufacturing method of tempering the main leaf 20 in the two steps, that is to say the fifth and sixth steps, makes it possible to manufacture the main leaf 20 which includes: the elastic section 20b with the high fatigue strength; and the eye sections 20a with the high toughness.

It should be noted that when the manufacturing process is changed from the fifth step into the sixth step illustrated in FIG. 5A, the main leaf 20 is transferred from the tempering furnace 108 into the partial-heating device 109. During the transfer, the temperature of the main leaf 20 becomes lower. Thus, as illustrated in FIG. 7, the temperature of the main leaf 20 (the eye sections 20a) slightly decreases while the manufacturing process is changed from the fifth step into the sixth step.

Figure 8A:
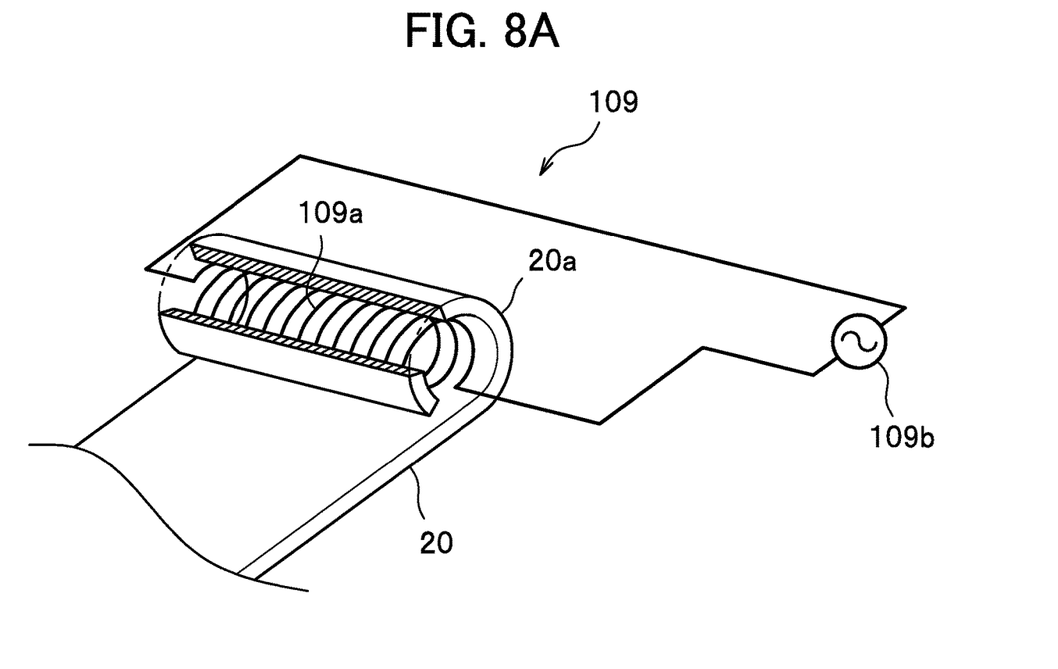
FIG. 8A is a diagram illustrating a partial-heating device for high-frequency heating the eye sections.
Figure 8B:
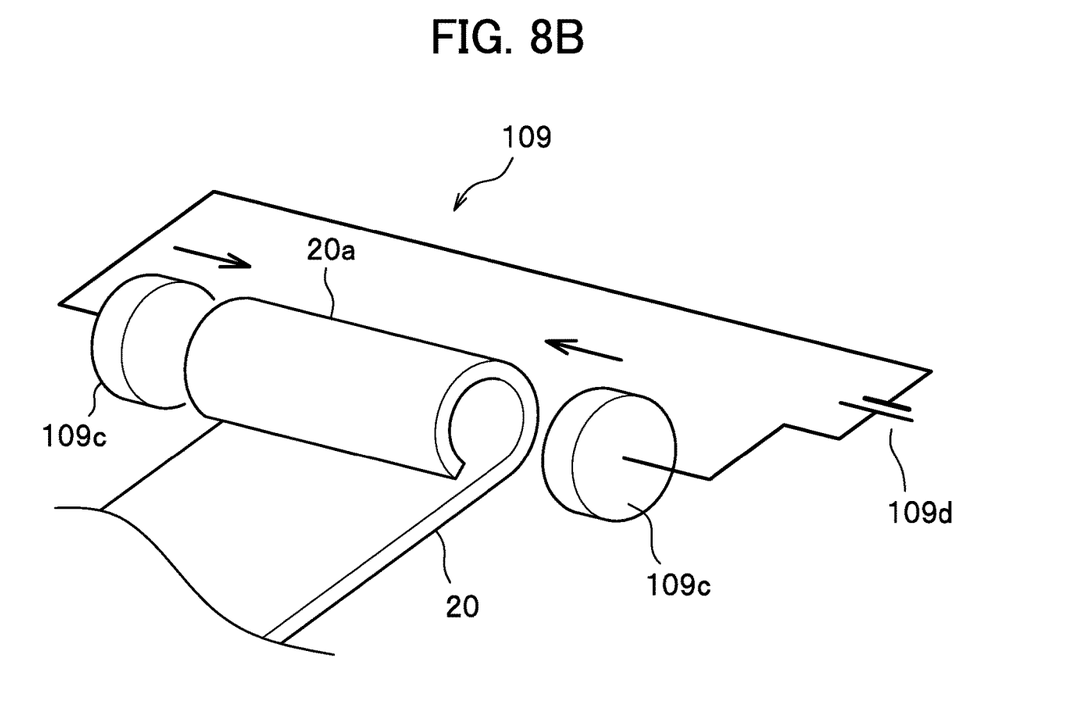
FIG. 8B is a diagram illustrating a partial-heating device for resistance heating the eye sections.

FIG. 8A is a diagram illustrating a partial-heating device for high-frequency heating the eye sections. FIG. 8B is a diagram illustrating a partial-heating device for resistance heating the eye sections.

In the sixth step (the high-temperature tempering step) illustrated in FIG. 5B, the partial heating is performed such that only the eye sections 20a (see FIG. 2) are heated. To this end, in the sixth step, the eye sections 20a are heated using either of the partial-heating devices 109 illustrated as examples in FIGS. 8A and 8B.

As long as the partial-heating devices 109 are configured to perform the partial heating for heating only the eye sections 20a, no specific restriction is imposed on their structure or heating method.

As one example, the partial-heating device 109 for high-frequency heating the eye sections 20a is illustrated in FIG. 8A. This partial-heating device 109 includes a coil section 109a and an alternating-current power supply 109b.

The coil section 109a is inserted into each eye section 20a of the main leaf 20, and is wound along the eye section 20a. The alternating-current power supply 109b makes an alternating current with a predetermined frequency flow through the coil section 109a. Magnetic force occurs in the coil section 109a because of electromagnetic induction. This magnetic force causes an eddy current in the eye section 20a. The eddy current generates Joule heat, which heats the eye section 20a. Since the Joule heat is generated in an area where the eddy current occurs, the partial-heating device 109 including the coil section 109a to be inserted into the eye section 20a performs the partial heating for heating only the eye section 20a.

In the sixth step (see FIG. 5B) of the process of manufacturing the leaf spring device 1 (see FIG. 2), the alternating-current power supply 109b of the partial-heating device 109 makes the alternating current with a voltage for heating the eye section 20a of the main leaf 20 to the predetermined temperature (th° C.) illustrated in FIG. 7 flow to the coil section 109a. This state is held for the predetermined length of time (h1 to h2 seconds) illustrated in FIG. 7. Thereafter, the eye section 20a is cooled (slowly cooled).

As another example, a partial-heating device 109 for resistance heating the eye section 20a of the main leaf 20 is illustrated in FIG. 8B. This partial-heating device 109 includes a pair of electrodes 109c, and a direct-current power supply 109d. The pair of electrodes 109c is attached to the two ends of the eye section 20a.

The direct-current power supply 109d makes a direct current flow between the electrodes 109c attached to the eye section 20a. In the eye section 20a, the direct current flows from one electrode 109c to the other electrode 109c. While the direct current flows in between, the eye section 20a generates heat due to its own resistance. Thereby, only the eye section 20a is heated.

In the sixth step (see FIG. 5B) of the process of manufacturing the leaf spring device 1 (see FIG. 2), the direct-current power supply 109d of the partial-heating device 109 makes the direct current with a voltage for heating the eye section 20a of the main leaf 20 to the predetermined temperature (th° C.) illustrated in FIG. 7 flow between the electrodes 109c. This state is held for the predetermined length of time (h1 to h2 seconds) illustrated in FIG. 7. Thereafter, the eye section 20a is cooled (slowly cooled).

As discussed above, as illustrated in FIG. 2, the leaf spring device 1 of the embodiment includes: the main spring 2 made from the single main leaf 20 and the two auxiliary leaves 21 stacked one on another; and the helper spring 3 made from the three auxiliary leaves 21 stacked one on another.

The main spring 2 includes the stacked main leaf 20 having the eye sections 20a.

In the manufacturing process (in the fifth step illustrated in FIG. 5A), the entirety of the main leaf 20 is tempered by being heated to the predetermined temperature (tl° C.) illustrated in FIG. 7. Thereafter (in the sixth step illustrated in FIG. 5B), the eye section 20a is tempered by being heated to the predetermined temperature (th° C.) illustrated in FIG.

7. The heating temperature (th° C.) in the sixth step is set higher than the heating temperature (tl° C.) in the fifth step.

Thus, since the eye sections 20a (see FIG. 2) are tempered at the higher temperature than the other section (the elastic section 20b) of the main leaf 20 (see FIG. 2), the toughness of the eye sections 20a increases.

The higher toughness of the eye sections 20a increases the durability of the eye sections 20a against the stress remaining on the eye sections 20a after the bushes 22a (see FIG. 2) are press-fitted into the eye sections 20a. This inhibits the delayed fracture of the eye sections 20a. The delayed fracture is inhibited from occurring particularly while the leaf spring device 1 is on the market.

Furthermore, the eye sections 20a have higher durability against the external force inputted from the front spindle 12a (see FIG. 1) and the rear spindle 13a (see FIG. 1) of the chassis 10. This inhibits the fatigue fracture of the eye sections 20a. The fatigue fracture is inhibited from occurring particularly when a long period of time elapses after the leaf spring device 1 is put on the market.

Meanwhile, since unlike the eye sections 20a, the other section (the elastic section 20b) of the main leaf 20 is not tempered at a high temperature, the other section (the elastic section 20b) of the main leaf 20 has high fatigue strength. Thereby, the main leaf 20, even though thinner, obtains high fatigue strength required in the market, and has an increased durability strength enough to satisfy the market needs.

On the other hand, the auxiliary leaves 21 are not tempered at a high temperature after the fatigue strength of the auxiliary leaves 21 are increased in the tempering in the fifth step (the tempering at tl° C. illustrated in FIG. 7). Thus, the auxiliary leaves 21, even though thinner, obtains high fatigue strength required in the market.

Accordingly, in a case where the leaf spring device 1 (see FIG. 2) made from the above-discussed main leaf 20 and the above-discussed auxiliary leaves 21 stacked one on another is used in a suspension apparatus of a vehicle, the suspension apparatus has higher durability strength. This largely decreases the likelihood that the fatigue fracture and the delayed fracture occur when a long period of time elapses after the leaf spring device 1 is put on the market.

As discussed above, the leaf spring device 1 (see FIG. 2) can be made by stacking the thin main leaf 20 and the thin auxiliary leaves 21. This makes it possible to effectively reduce the weight of the leaf spring device 1.

Figure 9A:
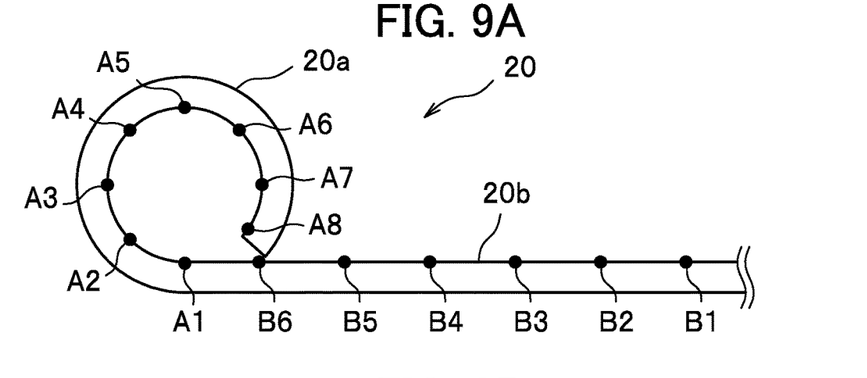
FIG. 9A is a diagram illustrating measurement points on the main leaf at which to measure Brinell hardness.
Figure 9B:
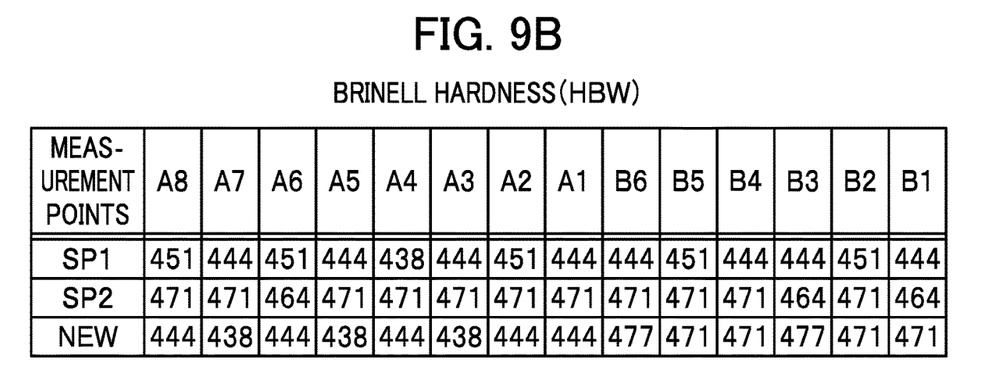
FIG. 9B is a table of illustrating the Brinell hardness (HBW) at each measurement point.
Figure 9C:
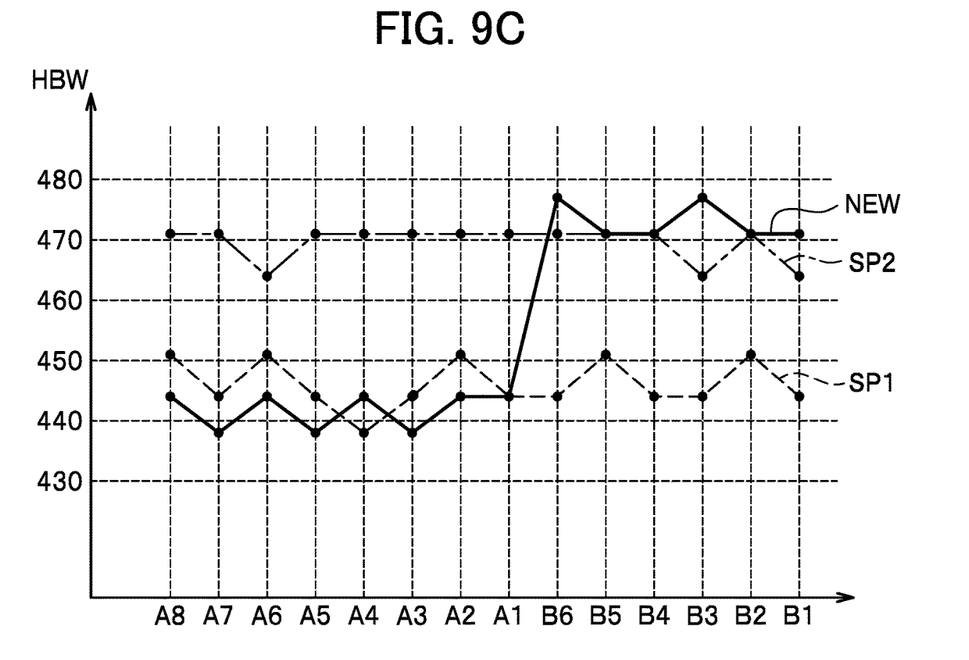
FIG. 9C is a graph of illustrating the Brinell hardness (HBW) at each measurement point.

FIG. 9A is a diagram illustrating measurement points on the main leaf at which to measure Brinell hardness. FIG. 9B is a table of illustrating the Brinell hardness (HBW) at each measurement point. FIG. 9C is a graph of illustrating the Brinell hardness (HBW) at each measurement point.

It should be noted that in the graph of FIG. 9C, the vertical axis represents the Brinell hardness (HBW), and the horizontal axis represents the measurement points.

"NEW" in each of FIGS. 9B and 9C shows results of, at the measurement points A1 to A8 and B1 to B6 illustrated in FIG. 9A, measuring the Brinell hardness (HBW) of the main leaf 20 of the leaf spring device 1 manufactured through the process (the first to eighth steps) of manufacturing the leaf spring device 1 (see FIG. 2) illustrated in FIGS. 4A to 4D and 5A to 5D.

It should be noted that: the measurement points A1 to A8 are measurement points set on the eye section 20a; and the measurement points B1 to B6 are measurement points set on the elastic section 20b.

In addition, "SP1" in each of FIGS. 9B and 9C represents comparative data on the Brinell hardness (at the measurement points A1 to A8 and B1 to B6) of a sample 1 whose entirety is normal-tempered in the fifth step illustrated in FIG. 5A but is not high temperature-tempered at the sixth step. "SP2" in each of FIGS. 9B and 9C represents comparative data on the Brinell hardness (at the measurement points A1 to A8 and B1 to B6) of a sample 2 whose entirety is high temperature-tempered at the sixth step illustrated in FIG. 5B. Incidentally, in FIG. 9C, the sample 1 (SP1) is indicated with a dashed line; the sample 2 (SP2) is indicated with a chain line; and the embodiment (NEW) is indicated with a solid line.

The measurement points are determined as follows. The measurement point B1 is at the center of the main leaf 20. The measurement points B2 to B6 equally divide the distance of the elastic section 20b from the measurement point B1. Meanwhile, the measurement points A1 to A8 equally divide the circle of the eye section 20a.

As illustrated in FIGS. 9B and 9C, the Brinell hardness at the measurement points A1 to A8 and B1 to B6 of the sample 1 (SP1) whose entirety was normal-tempered in the fifth step illustrated in FIG. 5A but was not high temperature-tempered at the sixth step was in a range of 438 HBW to 451 HBW.

As a whole, the main leaf 20 like this has higher fatigue strength. In contrast, the eye section 20a has lower toughness, and is thus more likely to cause the fatigue fracture and the delayed fracture.

Meanwhile, the Brinell hardness at the measurement points A1 to A8 and B1 to B6 of the sample 2 (SP2) whose entirety was normal-tempered in the fifth step illustrated in FIG. 5A and was further high temperature-tempered at the sixth step was in a range of 464 HBW to 471 HBW.

As a whole, the main leaf 20 like this has higher toughness. Thus, the fatigue fracture and the delayed fracture of the eye section 20a are inhibited. In contrast, the elastic section 20b has lower fatigue strength.

As for the main leaf 20 manufactured with the manufacturing method (the method of manufacturing the leaf spring device) of the embodiment, as illustrated in FIGS. 9B and 9C, the Brinell hardness at the measurement points A1 to A8 of the eye section 20a was in a range of 438 HBW to 444 HBW, whereas the Brinell hardness at the measurement points B1 to B6 of the elastic section 20b was in a range of 471 HBW to 477 HBW.

In other words, since the entirety of the main leaf 20 is normal-tempered in the fifth step illustrated in FIG. 5A and only the eye section 20a is thereafter high temperature-tempered in the sixth step, the Brinell hardness of the eye section 20a is made lower than that of the elastic section 20b.

In sum, the manufacturing method (the method of manufacturing the leaf spring device) of the embodiment makes it possible to manufacture the main leaf 20 (the leaf spring device 1) including: the eye section 20a with the higher toughness; and the elastic section 20b with the higher fatigue strength.

FIGS. 9A to 9C illustrate: the measurement points on the illustrated half of the main leaf 20 relative to the center (the measurement point B1); and the measured values there. Substantially similarly, the Brinell hardness is distributed in the unillustrated half of the main leaf 20 as well.

It should be noted that what is known about the main leaf 20 is that: if the Brinell hardness of the eye section 20a is equal to or lower than 461 HBW, the eye section 20a has toughness sufficient as a product; and if the Brinell hardness of the elastic section 20b is higher than 461 HBW, the elastic section 20b has fatigue strength sufficient as a product. Accordingly, the eye section 20a (whose Brinell hardness is in the range of 438 HBW to 444 HBW) and the elastic section 20b (whose Brinell hardness is in the range of 471 HBW to 477 HBW) obtained through the manufacturing method of the embodiment sufficiently satisfy their respective performances required as the products.

It should be noted that the present invention can be carried out by changing the design depending on the necessity within the scope not departing from the gist of the present invention.

For example, the undercoating in the seventh step illustrated in FIG. 5C may be achieved as a step of dipping the main leaf 20 and the auxiliary leaves 21 into undercoating paint filled in a container. Similarly, the coating in the eighth step illustrated in FIG. 5D may be achieved as a step of dipping the leaf spring device 1 into coating paint filled in a container.

Furthermore, the shape of the eye section 20a (see FIG. 3) is not limited to the circular form into which the end portion of the main leaf 20 (see FIG. 3) is rolled upward to the inside. The shape of the eye section 20a may be a circular form into which the end portion of the main leaf 20 is rolled downward to the inside. Furthermore, the shape of the eye section 20a is not limited to the circular form, the eye section 20a may be shaped like other polygons such as a rectangle.

Moreover, the leaf spring device 1 (see FIG. 2) may be made from the single main leaf 20 (see FIG. 2) alone without including the auxiliary leaves 21 (see FIG. 2). Otherwise, the leaf spring device 1 may be made from the main leaf 20 and at least one auxiliary leave 20 stacked one on another.

In addition, the material (steel) of the main leaf 20 (see FIG. 3) and the auxiliary leaves 21 (see FIG. 2) is not limited to SUP9 (one of the spring steels). In a case where a plate made from a steel different from SUP9 is used for the main leaf 20 and the auxiliary leaves 21, the Brinell hardness (HBW) of the eye section 20a (see FIG. 2) and the Brinell hardness (HBW) of each elastic section 20b (see FIG. 2) are appropriately set depending on the characteristics of the steel plate uses as the material. No matter what material the steel plate of the main leaf 20 is made of, the elastic section 20b has fatigue strength sufficient as a product if the Brinell hardness of the elastic section 20b is higher than 461 HBW, and the eye section 20a has toughness (durability) sufficient as a product if the Brinell hardness of the eye section 20a is equal to or lower than 461 HBW.

REFERENCE SIGNS LIST

1 leaf spring device
20 main leaf (leaf)
20a eye section (connecting section)
20b elastic section
21 auxiliary leaf (leaf)

The invention claimed is:

1. A method for manufacturing a leaf spring device including a main leaf made of a steel plate, comprising:
   an eye section forming step of forming an eye section serving as a connecting section by rolling an end portion of an elastic section of the main leaf into a circular form,
   a normal-tempering step of tempering the elastic section of the main leaf and at least one auxiliary leaf, the elastic section configured to generate elastic force when bent;
   a high-temperature tempering step of tempering the connecting section at a higher temperature than the elastic section in the normal-tempering step without heating the elastic section and the at least one auxiliary leaf; and
   an assembling step of assembling the leaf spring device by stacking the main leaf and the at least one auxiliary leaf one on another, after the high-temperature tempering step, the main leaf including the eye section formed in the eye section forming step, the at least one auxiliary leaf including no eye section.

2. The method for manufacturing the leaf spring device according to claim 1,
   wherein the normal-tempering step is a step of tempering the elastic section such that the elastic section has a Brinell hardness higher than 461 HBW, and
   wherein the high-temperature tempering step is a step of tempering the connecting section such that the connecting section has a Brinell hardness of 461 HBW or less.

* * * * *